Patented June 2, 1936

2,042,696

UNITED STATES PATENT OFFICE 2,042,696

COMPOSITIONS USEFUL FOR THE PRODUCTION OF AZO DYESTUFFS AND THEIR APPLICATION

Marcel-Joseph-Gustave Bader, Strasbourg, Bas-Rhin, France

No Drawing. Application December 7, 1933, Serial No. 701,375. In France December 13, 1932

7 Claims. (Cl. 8—6)

The present invention relates to new compositions useful for the production of azo dyestuffs and their application.

It has been found that by mixing aromatic nitramines with substances capable to give with diazo compounds azo dyestuffs, stable compositions are obtained which, when treated in solution or suspension as well as upon textile fibres with nitrous acid in presence of water, yield azo dyestuffs.

It is, therefore, an object of the present invention to provide compositions suitable for the production of azo dyestuffs on treatment with nitrous acid.

In order to prepare the compositions, which are the object of the present invention, substituted or unsubstituted aromatic nitramines of the general formula R—NH—NO$_2$, wherein R represents an aromatic mono- or poly-nuclear radical, are mixed with substances capable to give with diazo compounds azo dyestuffs.

The aromatic nitramines used in the present process may be prepared by any known processes and can be used as free nitramines or as their salts, preferably as alkali metal salts which are generally soluble in water.

The aromatic nitramines may contain one or several nitramine groups and substituents such as nitro, halogen, thio, aryl-azo, aralkyl, aryl, arylcarbonyl, sulphonaryl, alkyl, alkoxy, phenoxy and substituted amino groups, but preferably no sulphonic or carboxylic acid groups, as one of the objects of the present invention is to provide compositions for the production of water-insoluble azo dyestuffs.

As suitable aromatic nitramines those deriving from the following compounds can be cited: nitranilines, chloranilines, chloranisidines, m-xylidine, o-phenetidine, o-anisidine, nitrotoluidines, nitroansidines, nitrochloranilines, nitrochlortoluidines, chlortoluidines, naphthlylamines, aminohydroquinone ethers and their substitution products, monoacidyl-p-phenylenediamines and their substitution products, aminoketones, such as aminoacetophenones, aminobenzophenones, aminosulphones such as amino-methylsulphones, aminodiphenylsulphones, monoaminodiphenyls, aminoalkoxydiphenylamines and their substitution products, amino-diphenylethers and their substitution products, diaminodiphenyls and their substitution products, aminocarbazols and their substitution products, aminoanthraquinones and other similar compounds having an amino group that can be transformed into a nitramine group.

As compounds capable to give with diazo compounds azo dyestuffs and suitable to be mixed with the aromatic nitramines for the purpose herein described, substances generally known under the name of coupling components can be used. They may contain water-solubilizing groups such as sulphonic- and carboxylic acid groups, but as one of the objects of the present invention is the production of water-insoluble azo dyestuffs, such coupling components that are free from sulphonic- and carboxylic acid groups will be preferably used in mixture with the aromatic nitramines.

Such suitable compounds are f. i. the bodies containing a methylene group capable of coupling with diazo compounds, such as for example pyrazolone derivatives or derivatives of a β-ketone-acid, such as arylamides of aceto-acetic acid such as for example the anilide, the nitranilide, anisidide or diasylacetylarylamines such as diacetoacetylbenzidine or -tolidine or other products of condensation from aceylacetic acid ester with di- and mono-amino bases; the terephthaloyl-bis-acetic acid arylides, the naphthols and their derivatives, such as β-naphthol and its derivatives such as acylaminonaphthols, or arylaminonaphthols; the hydroxycarboxylic acids of the naphthalene, carbazol and anthracene series and their derivatives, especially their arylides such as the anilide, toluidide, methoxyanilide, nitranilide, chloranilide, naphthalide or compounds such as 2.3-hydroxyanthracene carboxylic acid and its arylides, hydroxycarbazolcarboxylic acids, hydroxynaphthocarbazolcarboxylic acids, hydroxydiphenylaminecarboxylic acids and arylides of the said compounds or such arylides that contain in the aryl group more than one substituent, or the methylene derivatives of the above cited arylides obtained by the action of formaldehyde thereon; derivatives of α-naphthol coupling in a β-position like the 4'-oxynaphthylphenylketone and similar compounds; further it is also possible to use compounds such as oxynaphthindol, 1.3-dioxyquinoline and sulphazones and similar heteronuclear coupling components, which can also belong to the carboxylic acid arylide series.

In order to prepare the compositions useful for the production of azo dyestuffs, the aromatic nitramines, preferably as their alkalimetal salts, are thoroughly mixed with the cited compounds, eventually in presence of suitable metal salts and alkali metal nitrites.

Instead of starting from alkali metal salts of the nitramines and of the coupling compounds, it is sometimes preferable to mix the nitramines and the coupling compounds with an alkali, preferably using an excess of alkali. In order to prepare compositions ready for use and easily soluble in water, it is advisable to mix the alkali metal salts of the aromatic nitramines with the alkalimetal salts of the coupling compounds in presence of an alkali and an alkali metal nitrite. Such mixtures are then dry powders, which can be more or less colored according to the components used and which are perfectly stable and ready for the production of azo dyestuffs, the dyestuffs being produced by the sole action of an acid on said compositions.

Sometimes it is advantageous to prepare compositions containing a certain amount of a solvent or of a diluting agent, such compositions being then pastes, readily soluble in water or in thickenings and therefore of easy use for example for printing purposes, as the preparation of such a printing paste will merely consist in mixing the compositions with the thickening.

As alkalis that can be used for the preparation of the new compositions the following compounds can be used: sodium carbonate and hydroxide, potassium carbonate and hydroxide, sodium and potassium bicarbonate, trinatriumphosphate. As nitrites preferably those of the alkali metal series are employed.

As water-soluble salts that can be used as a part of the said compositions, the following can be cited: alkali metal chlorides, sulphates, phosphates, bicarbonates, rhodanates, borofluorides, fluorides, oxalates, acetates, formates, lactates, naphthalene sulphonates and their alkylated derivatives and other salts of alkyl and aryl sulphonic acids that act as wetting, dispersing and emulsifying agents, or other salts that possess a neutral character.

Sometimes it is advantageous to add to the printing pastes stabilizing substances such as acetaldehyde, formaldehyde, paraformaldehyde and glucose.

When it is intended to prepare the new compositions in form of pastes, it is preferable to add to the mixtures besides a certain quantity of water, also a certain proportion of organic solvents such as ethanol, glycerine, glycol ether, pyridine and the like.

The mixing of the components is preferably carried out in mills and at a temperature not exceeding 100° C., but generally at room temperature.

It is further advantageous to prepare such compositions that contain equimolecular quantities of aromatic nitramines and of coupling compounds, but also an excess of one of the components can be present in the mixture without disadvantages. The quantities of an alkali and of an alkali metal nitrite added to the mixture can be varied within wide limits.

The compositions prepared in the manner described are dry powders or pastes or solutions and are very useful for the production of azo dyestuffs, when they are subjected to a treatment with nitrous acid.

The treatment of the said compositions with nitrous acid may be carried out in presence of textile fibres or organic or inorganic carriers in order to produce dyeings or pigments.

In order to produce the azo dyestuffs on such carriers, the carriers impregnated or mixed with the new compositions are subjected to a treatment with nitrous acid, which transforms the aromatic nitramines into diazo- or polyazo compounds, which then copulate with the coupling agents present.

The treatment of the mixtures with nitrous acid can be carried out at a lower or higher temperature, such as at ageing temperature. This treatment may further be carried out with gaseous nitrous acid, or with its solutions, preferably its aqueous solutions.

By using the compositions that already contain besides the nitramine and the coupling component the necessary amount of a nitrite, the nitrous acid may be produced within the mixture by subjecting it to a treatment with an acidic substance capable to liberate the nitrous acid from its salts.

In such a case the treatment with the acidic substance can be carried out in the cold or in the heat and with vapours or with concentrated or diluted aqueous solutions of the acidic substances.

Acidic substances preferably used in the present process are the organic and inorganic acids and their acid salts such as formic acid, acetic acid, oxalic acid, lactic acid, tartaric acid, chloracetic acid, naphthalene and benzene sulphonic acids, sulphuric acid, hydrochloric acid, phosphoric acid or salts such as the acid alkali metal salts of the sulphuric and phosphoric acid.

The quantity of the acidic substance used must be so chosen that it is sufficient to decompose all of the salts present in the mixture. It is, therefore, possible to develop the azo dyestuffs on the carriers, by treating the carriers impregnated or mixed with the new compositions, with cold or hot aqueous solutions of the acidic substances.

Sometimes it is further preferable to subject the carriers impregnated or mixed with the new compositions after the first treatment with acidic substances, to a second treatment with alkalis. This is especially indicated in the case where the diazo- or the polyazo compounds produced from the nitramines by the treatment with the acidic substances, do only slowly copulate with the coupling components. In such a case the second treatment is preferably carried out with the alkaline solutions and at low or elevated temperature.

The present invention provides, therefore, new compositions of matter suitable for the production of azo dyestuffs and a process for the production of such dyestuffs.

Such compositions are especially valuable for the production of fast tints and printings on textile fibres of cellulosic or animal origin and for the production of lakes on suitable organic or inorganic carriers.

The new compositions are especially suitable for the production of dyeings and printings with water-insoluble azo-dyestuffs on textile fibres, which dyeings and printings possess excellent fastness properties.

One object of the present invention is, therefore, to provide new compositions useful for the production of azo dyestuffs and which consist of aromatic nitramines and of compounds capable to give with diazo compounds azo dyestuffs.

Another object of the present invention is to provide new compositions containing the above said substances in form of their water-soluble salts.

A further object of the present invention is to provide new compositions containing water-soluble salts of aromatic nitramines and of compounds capable to give with diazo compounds water-insoluble azo dyestuffs, an alkali hydroxide and an alkali metal nitrite.

Still another object of the present invention is to provide stable compositions containing an alkali metal salt of an aromatic nitramine, an alkali hydroxide, an alkali metal nitrite and a water soluble salt of an arylide of a hydroxycarboxylic acid of the naphthalene, carbazol and anthracene series.

Still another object of the present invention is to provide stable compositions containing an alkali metal salt of an aromatic nitramine, an alkali hydroxide, an alkali metal nitrite and a water-soluble salt of a body containing a methylene group capable of coupling with diazo compounds.

Still another object of the present invention is to provide stable compositions containing an alkali metal salt of an aromatic nitramine, an alkali hydroxide, an alkali-metal nitrite and a water-soluble salt of a carbonyl derivative of an α-hydroxynaphthalene.

Another object of the present invention is to provide a process for the production of azo dyestuffs, consisting in treating the above said compositions with nitrous acid.

Still another object of the present invention is to provide a process for the production of azo dyestuffs consisting in subjecting to a treatment with acidic substances the compositions consisting of aromatic nitramines, of a sale of nitrous acid and of substances capable to give with diazo compounds azo dyestuffs.

Still another object of the present invention is to provide a process for the production of water-insoluble azo dyestuffs on textile material and on organic or inorganic carriers, consisting in subjecting the textile material impregnated with or the carrier mixed with the said compositions to a treatment with nitrous acid or with an acidic substance.

The following examples, without being limitative, illustrate the present process, the parts being by weight.

Example 1

If an aqueous solution, containing equimolecular quantities of p-nitrophenylnitraminate of sodium (of the formula

of dimethylsulphanilate of sodium and of nitrite of sodium is treated with acetic acid, or with the theoretical quantity of sulphuric acid, it becomes rapidly colored to a red-brown shade, owing to the formation of the azo compound: p-nitrobenzene-azo-dimethylaminobenzenesulphonate of sodium.

The obtained dyestuff dyes wool, especially after acidifying the solution with a mineral acid.

Example 2

Another water-soluble azo dyestuff is obtained, if a colorless solution containing equimolecular quantities of 2.5-dichlor-tolyl-4-nitraminate of sodium, of 6-hydroxy-2-naphthalenesulphonate of sodium and of nitrite of sodium, is treated at elevated temperature (50–70° C.) with acetic acid or with a calculated amount of sulphuric acid. The solution becomes reddish-orange and can be used for dyeing wool.

Example 3

The formation of an insoluble dark-red azo dyestuff results on introduction at ordinary temperature of nitrous vapours into an aqueous solution of equimolecular parts of 1-methyl-3-nitro-6-phenyl-nitraminate of sodium and of 3-carboxy-anilido-2-naphtholate of sodium. The dyestuff thus obtained possesses the following formula:

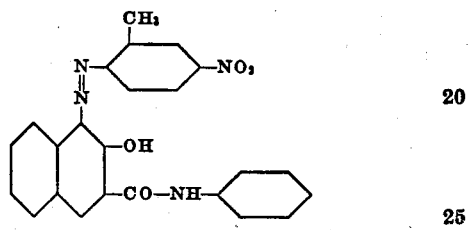

Example 4

The same reaction can be carried out on cotton goods which have been impregnated with the aqueous solution of Example 3, dried or not dried, and exposed to the action of moist nitrous acid vapours. The goods become then dyed in a dark red shade completely fast to washing.

The following examples illustrate the application of the claimed process for the purpose of producing fast printings on textile material:

Example 5

2.5 parts of the crystallized sodium salt of 2.5-dichlorphenylnitraminate of the formula

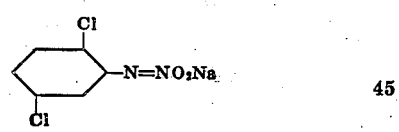

are dissolved in 17.5 parts of hot water, and the solution is caused to run into the following mixture of
47 parts of starch tragacanth thickening,
3 parts of glycerine,
1 part of caustic soda solution (34° Bé.),
1 part of sodium nitrite dissolved in
6 parts of water and
2 parts of pyridine bases.
---
80 parts To this paste there is added a solution of:

3.5 parts of diacetoacetyltolidine,
2.5 parts of ethanol,
3 parts of caustic soda solution (34° Bé),
11 parts of hot water, making in all
---
100 parts The goods are printed, dried, passed through a hot aqueous solution (90° C.) containing 40–75 grams of formic acid and 50–100 grams of sodium sulphate per liter, rinsed, soaped, rinsed again and dried.

A fast golden-yellow print is thus obtained.

Example 6

There are dissolved:
10 parts of the well dried and powdered mixture composed of
   21 parts of o-nitrophenylnitraminate of sodium,
   6 parts of caustic soda,
   27 parts of 2-hydroxy-3-naphthoylaniline,
   16 parts of sodium nitrite,
   30 parts of sodium phosphate, in
6 parts of ethanol,
2 parts of formaldehyde of 40%,
29 parts of hot water and the solution is caused to run into the following paste:
48 parts of starch tragacanth thickening,
2 parts of glycol,
1 part of caustic soda solution (34° Bé.)
2 parts of pyridine bases, 100 parts to obtain a printing paste which is printed on unprepared cotton, dried and grounded with a cold solution containing 50 g. of concentrated sulphuric acid per liter, and thereon after a short time (30 seconds) passed through a bath containing f. i. 50 g. of sodium acetate per liter, then rinsed, soaped, rinsed again and dried. Orange prints are thus obtained. The dyestuff produced according to this example possesses the following formula:

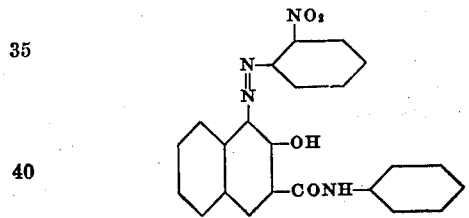

Example 7

0.5 parts of 1-methyl-3-nitro-6-phenylnitramine and
0.6 parts of 2-oxy-3-naphthoyl-p-anisidine are dissolved with
1.5 parts of Turkey red oil,
2 parts of caustic soda solution (34° Bé.),
2 parts of formaldehyde of 40% in
24.4 parts of hot water, and the solution is diluted with
60 parts of starch tragacanth thickening,
1 part of sodium nitrite,
2 parts of gylcerine,
6 parts of water 100 parts Cotton pieces are printed with the above prepared paste, dried, developed by grounding with cold acetic acid of 6° Bé. and worked up in the usual manner. It results in a pink print of very good fastness. The dyestuff produced according to this example possesses the following formula:

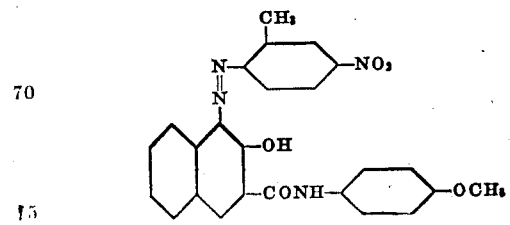

Example 8

10 parts of a powder prepared by intermixing
   10 parts of 1-methoxy-4-nitro-6-nitraminate of sodium,
   250 parts of 1-methoxy-4-nitro-6-nitraminate of sodium,
   300 parts of 2-hydroxynaphthoyl-3-carboxylic acid-β-naphthylamide,
   60 parts of caustic soda,
   240 parts of sodium carbonate,
   105 parts of sodium nitrite,
   45 parts of sodium fluoride 1000 parts are dissolved in
8 parts of ethanol,
1.5 parts of formaldehyde,
30.5 parts of hot water.

The solution is then added to 50 parts of warm starch tragacanth thickening and cooled down. Textile goods are printed therewith, dried and developed by grounding first with a cold solution of 8% oxalic acid and thereon they are passed through an alkaline solution of 4% of sodium carbonate. A vivid red is obtained. The development is also possible by a treatment with steam charged with vapours of acetic acid. The dyestuff produced by this example possesses the following formula:

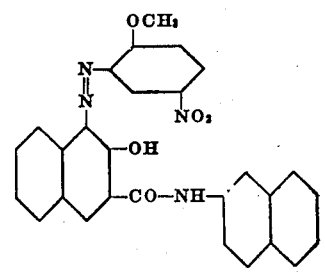

A more bluish-red is obtained by replacing in this example the 2-hydroxynaphthalene-3-carboxylic acid-β-naphthylamine by the same quantity of 2-hydroxy-naphthalene-3-carboxylic acid-4'-chloro-2'-methyl-1'-anilide.

Example 9

A bluish-red is also obtained by printing with a thickened mixture of 2.5 parts of 1-methyl-3-nitro-4-phenylnitraminate of sodium,
2.7 parts of 2-hydroxy-3-naphthoylaniline,
1.8 parts of sodium nitrite,
3 parts of caustic soda dissolved in water and contained in 100 parts of the printing paste, and developing the cotton goods by grounding with a cold solution of 75 g. of sulphuric acid per liter of water, in presence of 1 g. of isopropylnaphthalenesulphonate of sodium, followed by a passage through a solution of sodium carbonate (50 g. per liter).

If in this example one replaces the cited 2.5 parts of 1-methyl-3-nitro-4-nitraminate by 3 parts of 1-chloro-3-nitro-4-phenylnitramine of sodium, one obtains under the same conditions a fast scarlet red.

Example 10

Black prints are obtained in printing on cotton goods the colour prepared by dissolving:

- 4 parts of 1-methoxy-3-nitro-6-phenylnitraminate of sodium,
- 4 parts of hydroxy-naphthocarbazol-carboxylic acid-anilide,
- 2.4 parts of sodium nitrite,
- 1 part of caustic soda,
- 1.6 parts of sodium carbonate in
- 37 parts of hot water and making it up to
- 100 parts with warm starch tragacanth thickening and cooling down.

The prints are developed by a passage through a hot bath of 90° C. containing 50 grams of formic acid and 50 grams of common salt per liter, or 85 grams of sodium bisulphate per liter.

If the hydroxy-naphthocarbazolcarboxylic acid anilide is replaced in the above example by the 2-hydroxy-3-carbazolcarboxylic acid arylide, the resulting print is brown and possesses good fastness properties.

Example 11

Very fast garnet red prints are obtained by printing a printing paste of the following composition. 10 parts of a dried mixture prepared by intermixing

- 25 parts of 1-methoxy-3-nitro-6-phenylnitraminate of sodium,
- 25 parts of 4-hydroxy-naphthylphenylketone,
- 15 parts of caustic soda,
- 20 parts of sodium nitrite,
- 15 parts of sodium carbonate, 100 parts are dissolved in 40 parts of boiling water and introduced into 50 parts of warm starch tragacanth thickening.

After printing and drying the goods are grounded with a solution containing 300 g. of acetic acid of 6° Bé. per liter, rinsed, soaped, again rinsed and dried.

Instead of 4-hydroxy-naphthylphenylketone one can take one of the other coupling components described in the U. S. Patent No. 1,453,660.

What I claim is:—

1. A water-soluble composition of matter for the production of water-insoluble dyestuffs on textile fibres, comprising a mixture of an aromatic nitramine, an alkali in a quantity sufficient to transform the nitramine into its alkali metal salt, and a substance capable of coupling with diazo compounds to yield a water-insoluble azo dyestuff.

2. A water-soluble composition of matter for the production of water-insoluble dyestuffs on textile fibres, comprising a mixture of an alkali metal salt of an aromatic nitramine, an alkali metal nitrite and a substance capable of coupling with diazo compounds to yield a water-insoluble azo dyestuff.

3. A water-soluble composition of matter for the production of water-insoluble dyestuffs on textile fibres, comprising a mixture of an alkali metal salt of an aromatic nitramine free from sulphonic and carboxylic acid groups, sodium nitrite and an arylide of an ortho-hydroxycarboxylic acid of the benzene, naphthalene, carbazol and anthracene series.

4. A water-soluble composition of matter for the production of a water-insoluble dyestuff on textile fibres, comprising a mixture of an alkali metal salt of an aromatic nitramine free from sulphonic and carboxylic acid groups, sodium nitrite and a p-hydroxy-naphthyl-arylketone capable of coupling with diazo-compounds.

5. A process for producing water-insoluble azo dyestuffs on textile fibres, comprising treating with aqueous nitrous acid textile fibres impregnated with a mixture comprising an alkali metal salt of an aromatic nitramine and a substance capable of coupling with diazo compounds to yield a water-insoluble azo dyestuff.

6. A process for producing water-insoluble azo dyestuffs on textile fibres, comprising treating with an aqueous solution of an acidic substance textile fibres impregnated with a mixture of an alkali metal salt of an aromatic nitramine, an alkali, an alkali metal nitrite and a substance capable of coupling with diazo compounds to yield a water-insoluble azo dyestuff.

7. In a process of producing water-insoluble azo dyestuffs on textile fibres, the steps comprising impregnating the textile fibres with a mixture consisting of an alkali metal salt of an aromatic nitramine, an alkali, an alkali metal nitrite and a substance capable of coupling with diazo compounds to yield a water-insoluble azo dyestuff, and developing the color by reacting upon the impregnated textile fibres with an aqueous solution of an acidic substance.

MARCEL-JOSEPH-GUSTAVE BADER.